(12) United States Patent
Dorfman

(10) Patent No.: US 8,769,707 B2
(45) Date of Patent: Jul. 1, 2014

(54) SYSTEMS AND METHODS FOR CHALLENGE-RESPONSE ANIMATION AND RANDOMIZATION TESTING

(75) Inventor: Scott Dorfman, Reston, VA (US)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 13/620,347

(22) Filed: Sep. 14, 2012

(65) Prior Publication Data

US 2013/0024950 A1 Jan. 24, 2013

Related U.S. Application Data

(62) Division of application No. 12/726,708, filed on Mar. 18, 2010, now Pat. No. 8,516,606.

(60) Provisional application No. 61/202,662, filed on Mar. 24, 2009.

(51) Int. Cl.
*G06F 21/36* (2013.01)

(52) U.S. Cl.
USPC ............... 726/29; 726/4.5; 713/170; 382/177

(58) Field of Classification Search
USPC .................................... 726/29, 4, 5; 713/170
See application file for complete search history.

(56) References Cited

U.S. PATENT DOCUMENTS

| | | | |
|---|---|---|---|
| 7,149,801 B2 * | 12/2006 | Burrows et al. ............... | 709/225 |
| 7,533,411 B2 | 5/2009 | Goodman et al. | |
| 7,624,277 B1 | 11/2009 | Simard et al. | |
| 7,697,758 B2 | 4/2010 | Vincent et al. | |
| 7,712,141 B1 | 5/2010 | Agrawal et al. | |
| 7,770,112 B2 | 8/2010 | Iwakura et al. | |
| 7,856,477 B2 * | 12/2010 | Libbey et al. ................. | 709/206 |
| 2004/0199597 A1 * | 10/2004 | Libbey et al. ................. | 709/207 |
| 2005/0289645 A1 | 12/2005 | Hori | |
| 2006/0095578 A1 | 5/2006 | Paya et al. | |
| 2006/0282660 A1 | 12/2006 | Varghese et al. | |
| 2006/0286530 A1 * | 12/2006 | Forrest et al. ................. | 434/323 |
| 2007/0005500 A1 * | 1/2007 | Steeves et al. ................ | 705/51 |

(Continued)

FOREIGN PATENT DOCUMENTS

WO WO 2008/091675 7/2008

OTHER PUBLICATIONS

Extended European Search Report, dated Oct. 30, 2012, in corresponding European Application No. 12005337.6 (6 page).

(Continued)

*Primary Examiner* — Amare F Tabor
(74) *Attorney, Agent, or Firm* — Finnegan, Henderson, Farabow, Garrett & Dunner, L.L.P.

(57) ABSTRACT

Systems and methods are provided for challenge/response animation. In one implementation, a request for protected content may be received from a client, and the protected content may comprise data. A challenge phrase comprising a plurality of characters may be determined, and a computer processor may divide the challenge phrase into at least two character subsets selected from the characters comprising the challenge phrase. Each of the at least two character subsets may include less than all of the characters comprising the challenge phrase. The at least two character subsets may be sent to the client in response to the request; and an answer to the challenge phrase may be received from the client in response to the at least two character subsets. Access to the protected content may be limited based on whether the answer correctly solves the challenge phrase.

18 Claims, 13 Drawing Sheets

(56) References Cited

U.S. PATENT DOCUMENTS

| | | |
|---|---|---|
| 2008/0066014 A1 | 3/2008 | Misra |
| 2008/0127302 A1 | 5/2008 | Qvarfordt et al. |
| 2009/0235327 A1 | 9/2009 | Jakobsson et al. |
| 2009/0249217 A1 | 10/2009 | Narayanaswami |
| 2009/0260068 A1 | 10/2009 | Hariharan et al. |
| 2010/0046790 A1 | 2/2010 | Koziol et al. |
| 2011/0159842 A1 | 6/2011 | Vander Veen et al. |

OTHER PUBLICATIONS

International Search Report and Written Opinion, mailed Aug. 9, 2010, in corresponding PCT Application No. PCT/US2010/028116 (8 pages).

* cited by examiner

SYSTEMS AND METHODS FOR CHALLENGE-RESPONSE ANIMATION AND RANDOMIZATION TESTING

RELATED APPLICATION(S)

This application is a divisional of U.S. application Ser. No. 12/726,708, filed on Mar. 18, 2010 now U.S. Pat. No. 8,516,606, which claims priority to U.S. Provisional Application No. 61/202,662, filed on Mar. 24, 2009, the disclosures of which are expressly incorporated herein by reference to their entireties.

BACKGROUND

I. Technical Field

The present disclosure generally relates to the field of computing and to techniques for providing challenge-response animation and testing targeted for a human. More particularly, and without limitation, the present disclosure relates to computerized systems and methods for randomizing and animating images on a display for purposes of ensuring a response is not generated by a computer impersonating a human. By way of example, the randomized and animated images can be used to control access to data or computerized services, as well as to prevent malicious computers from hacking or accessing protected content.

II. Background Information

Controlling access to data or computerized services can be implemented in many different ways. For example, data can be protected using techniques such as user names and passwords, hidden files, and/or attributes that prevent certain data from being read or modified. However, such techniques are insufficient when the goal is preventing automated access to data or computerized services while sharing the same freely with human users. For example, certain web pages may need to be protected from web robots or bots, while still making these web pages generally available to the public.

Completely automated public Turing tests to tell computers and humans apart ("CAPTCHA") techniques have been implemented. In general, a CAPTCHA is a challenge-response test that requires a human user to correctly identify and type displayed letters and/or digits in order to proceed with accessing data or computerized services. To prevent a web bot or malicious computer from automatically interpreting and entering the displayed letters and/or digits, the display may be distorted, warped, or combined with graphics (e.g., adding an angled or curved line).

Web bots typically incorporate optical character recognition ("OCR") techniques to overcome basic CAPTCHA content. To make it more difficult for bots and computers to correctly respond to a CAPTCHA challenge, increased distortion or warping can be used to defeat the automated optical character recognition. Such techniques, however, can make it much more difficult or impossible for human users to correctly identify the displayed letters and/or digits and, thus, defeat the usefulness of the CAPTCHA.

Conventional CAPTCHA techniques are also susceptible to other methods of automated access or completing a registration process. One technique is to use a "botnet" or a collection of web bots to "scrape" CAPTCHA images and send them to human users, who then solve the CAPTCHA for the web bot. The individual web bots can then simply proceed to access the protected content without further human intervention.

In view of the foregoing, there is a need for improved challenge-response techniques that are able to protect data or computerized services from web bots or computers capable of optical character recognition. Further, improved systems and methods are needed that are resistant to techniques that use humans to solve, for example, "scraped" CAPTCHA images. Moreover, improved systems and methods are needed that overcome the drawbacks of conventional CAPTCHA images, while at the same time provide displayed letters and/or digits that can easily be identified by a human user.

SUMMARY

Embodiments of the present disclosure relate to systems and methods for providing challenge-response animation and testing targeted for human users. In accordance with certain embodiments, computerized systems, methods, and computer-readable media are provided for challenge/response animation.

In accordance with certain embodiments, computer-implemented methods are provided that include receiving a request for protected content from a client, the protected content comprising data, determining a challenge phrase comprising a plurality of characters, and dividing, using a computer processor, the challenge phrase into at least two character subsets selected from the plurality of characters comprising the challenge phrase, each of the at least two character subsets comprising less than all of the characters comprising the challenge phrase. Such methods may also include sending the at least two character subsets to the client in response to the request, and receiving, from the client and in response to the at least two character subsets, an answer to the challenge phrase, wherein access to the protected content is limited based on whether the answer correctly solves the challenge phrase.

Consistent with additional embodiments of the present disclosure, systems are provided that include a processor, and a computer-readable medium containing instructions to configure the processor to receive a request for protected content from a client, the protected content comprising data, determine a challenge phrase comprising a plurality of characters, and divide the challenge phrase into at least two character subsets selected from the plurality of characters comprising the challenge phrase, each of the at least two character subsets comprising less than all of the characters comprising the challenge phrase. In addition, the processor may be further configured to send at least two character subsets to the client in response to the request; and receive, from the client and in response to the at least two character subsets, an answer to the challenge phrase, wherein access to the protected content is limited based on whether the answer correctly solves the challenge phrase.

Consistent with other embodiments, a computer-readable medium is provided that includes instructions to configure a processor to receive a request for protected content from a client, the protected content comprising data, determine a challenge phrase comprising a plurality of characters, and divide the challenge phrase into at least two character subsets selected from the plurality of characters comprising the challenge phrase, each of the at least two character subsets comprising less than all of the characters comprising the challenge phrase; sending the at least two character subsets to the client in response to the request. In addition, the processor may be further configured to receive, from the client and in response to the at least two character subsets, an answer to the challenge phrase, wherein access to the protected content is limited based on whether the answer correctly solves the challenge phrase.

In accordance with yet additional embodiments of the present disclosure, computer-implemented methods are provided that include accessing characters of a challenge phrase, determining a first processing to apply to a first group of characters from the challenge phrase, determining a second processing to apply to a second group of characters from the challenge phrase, the second processing being different than the first processing, generating, using a processor, a first image comprising the first group of characters using the first processing, generating, using the processor, a second image comprising the second group of characters using the second processing, and providing the first image and the second image for use in a challenge-response test to control access to protected content.

Further embodiments relate to computer-implemented methods that include receiving characteristics of a client requesting access to protected content, the protected content comprising data, determining a risk profile for the client based on the client characteristics, the risk profile reflecting a likelihood that the client is unauthorized to access the protected content, selecting a challenge characteristic of a challenge/response test based on the risk profile, and providing the selected challenge characteristic for generating a challenge/response test based on the selected challenge characteristic.

BRIEF DESCRIPTION OF THE DRAWINGS

The accompanying drawings, which are incorporated in and constitute a part of this disclosure, illustrate various embodiments and aspects of the present invention as set forth in the attached claims. In the drawings:

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
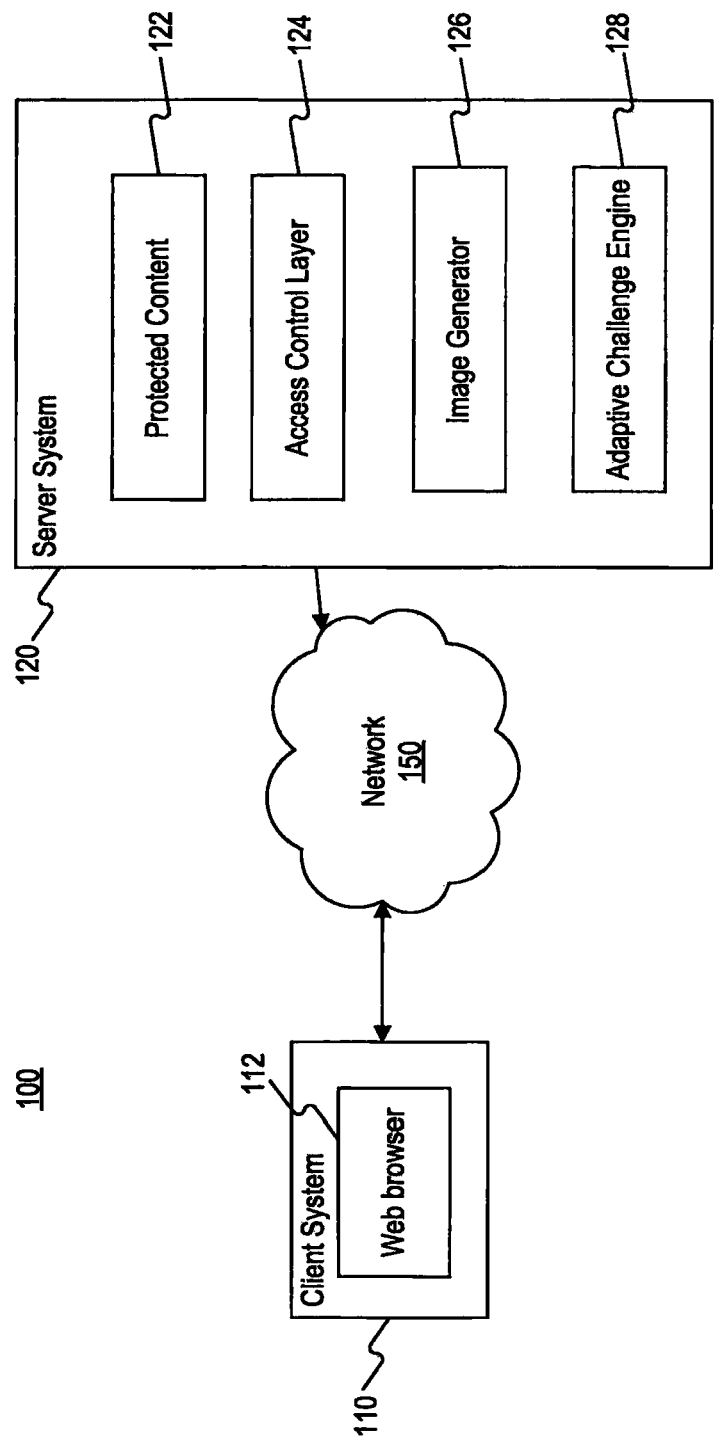
FIG. 1 illustrates a diagram of an exemplary system environment, consistent with certain embodiments of the invention.

FIG. 1 illustrates a diagram of an exemplary system environment that comprises a content sharing system 100, consistent with certain embodiments of the invention. Content sharing system 100 may include a client system 110 with web browser 112, and a server system 120 including one or more components, such as protected content 122, access control layer 124, image generator 126, and adaptive challenge engine 128. Protected content 122 may include any form of data, such as one or more web pages, files, programs, records, and/or other data. Protected content 122 may be stored in a storage device or maintained in a database (not shown). Access control layer 124 may ensure that only human users have access to protected content 122. Image generator 126 may generate images and/or animations used to present challenge phrases to client 110 for controlling access to protected content 122. Adaptive challenge engine 128 may determine characteristics of the challenge phrases and images/animations, based on certain characteristics of client system 110.

Consistent with certain embodiments, access control layer 124 may perform processing to provide access to protected content 122 by requiring a user at client system 110 to respond to a challenge-response test. The length of the challenge phrase may be determined by adaptive challenge engine 128, depending upon one or more characteristics of client system 110, such as characteristics that may suggest a user of client system 110 is a hacker. For example, if the IP address of client system 110 is obscured (i.e., of unknown origin or location) or corresponds to an IP address from a country known for high levels of hacking activity, adaptive challenge engine 128 may determine that a longer challenge phrase should be used by access control layer 124.

As discussed in more detail below, access control layer 124 may provide the challenge phrase as a series of images or frames. Additionally, or alternatively, the challenge phrase may be implemented as an animation generated by image generator 126. Image generator 126 may determine certain characteristics of the images or animation, such as background patterns and colors or obscuration/distortion of the characters used for the challenge phrase, based on or more characteristics determined by adaptive challenge engine 128. For example, adaptive challenge engine 128 may determine that obscured characters should be used when client system 110's IP address is from a country known for hacking activity.

Consistent with embodiments of the present disclosure, various types of files can be used to implement the images corresponding to a challenge phrase. For example, "image files" may include bitmap files (e.g., .bmp and variations thereof, collectively referred to herein as "BMP"), tagged image file format files (e.g., .tiff, .tif, and variations thereof, collectively referred to herein as "TIF"), and joint photographic experts group files (e.g., .jpg, .jpeg, .jpe, .jif, .jfif, jfi, and variations thereof, collectively referred to herein as "JPEG"). "Animation files" may include several images collectively used to generate an animation. Animation files may include graphics interchange format files (e.g., .gif, and variations thereof, collectively referred to herein as "GIF") and flash files (e.g., .swf, and variations thereof, collectively referred to herein as "SWF").

Client system 110 and server system 120 can each include one or more processors, storage devices, applications, and/or other hardware or software. In one embodiment, client 110 includes a personal computer or laptop with application software, including web browser 112. Server system 120 may include one or more servers or computers, as well as databases or storage devices. In one embodiment, server system 120 includes a server farm with a load balancer and a plurality of server computers. In another embodiment, server system 120 includes a set of connected computers that communicate with one another and handle requests from client system 110. Moreover, embodiments of server system 120 may include programmed modules or software, such as modules 124, 126 and 128 (see FIG. 1), as well as web server software for hosting web pages or sites.

Communication network 150, which can be implemented by any combination of wired or wireless technologies, allows client system 110 and server system 120 to communicate with one another for purposes of, for example, HTTP or other protocol based requests and responses, web page, file, or other data retrieval and storage, etc. Communication network 150 can be virtually any type or combination of networks, including a WAN such as the Internet, an intranet, and/or a home or office-based LAN.

Although FIG. 1 shows a particular number and arrangement of components, any arrangement and number of components can be implemented. For example, there may be one or more client systems 110 and/or server systems 120. For the purposes of this description, the major conceptual functions of the referenced embodiments are described herein as wholly resident on separate computers or devices. Alternative embodiments wherein the processing described on client system 110 and server system 120 is distributed across multiple computers, processors or modules are also possible. In addition, it is possible to combine the functionality of one or more components of FIG. 1 into one device or machine.

Figure 2:
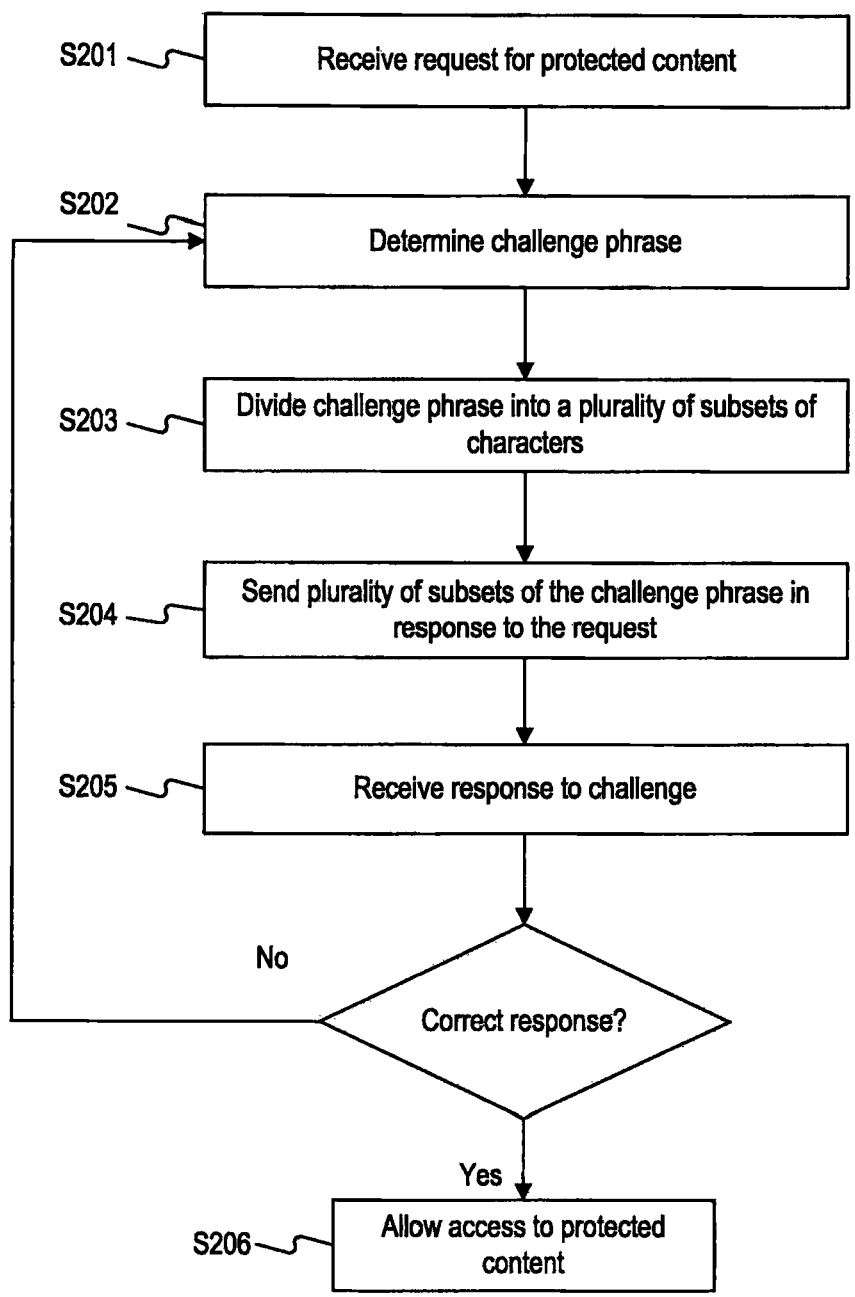
FIG. 2 is a flowchart of an exemplary method for protecting access to content, consistent with certain embodiments of the invention.

FIG. 2 is an exemplary flowchart of a method 200, consistent with certain embodiments of the invention. Method 200 may be implemented for protecting access to content in a system environment, such as exemplary system 100 (FIG. 1). Method 200 may be embodied in a computer-readable medium as instructions suitable for execution by one or more processors in server 120. For example, method 200 may be implemented by access control layer 124 on server 120.

For purposes of illustration, method 200 is described with reference to the exemplary embodiment of FIG. 1. As will be appreciated from this disclosure, however, method 200 may be adapted for use with other system environments, such as those providing public access to web pages or other data, as well as any computerized service (private or public).

As shown in FIG. 2, method 200 starts with step S201, where a request for protected content is received. For example, a user at client system 110 may want to view data available from server system 120, such as protected content 122. In such a case, client system 110 may send a request for the protected content 122 to server system 120, where access control layer 124 receives and processes the request. Before server system 120 will provide the protected content to client system 120, access control layer 124 may, among other things, verify that the client is being operated by a human user rather than a web bot or potential hacker.

At step S202, access control layer 124 may determine a challenge phrase that the user must correctly identify in order to access protected content 122. The challenge phrase may consist of one or more combinations of characters, such as letters, numbers, and/or other symbols. In accordance with one example, the challenge phrase is "6fKa4." In some embodiments, access control layer 124 may also provide one or more characteristics of client system 110 to adaptive challenge engine 128, and in response receive one or more characteristics for the challenge phrase. In such embodiments, access control layer 124 may determine the challenge phrase based on the characteristics received from adaptive challenge engine 128. For example, adaptive challenge engine 128 may determine that, based on the client's IP address, the challenge phrase should be six characters long. Additional examples of characteristics provided by adaptive challenge engine 128 are discussed below.

Figure 3:
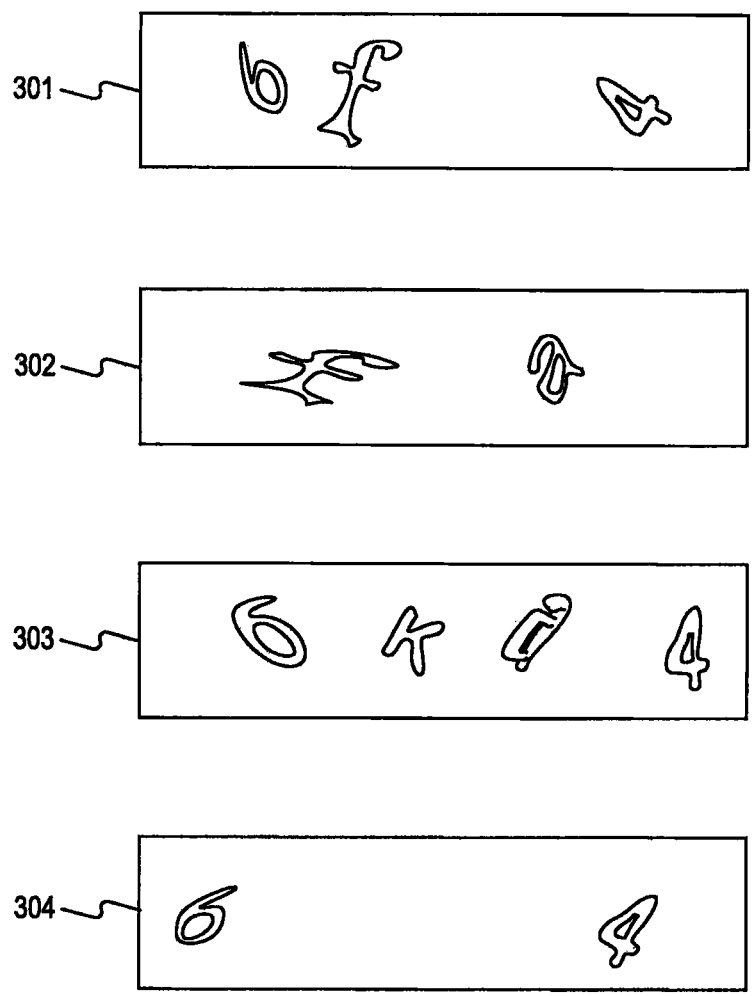
FIG. 3 illustrates an exemplary set of images for a challenge phrase, consistent with certain embodiments of the invention.

At step S203, access control layer 124 divides the challenge phrase into a plurality of subsets of the characters comprising the entire challenge phrase. In some embodiments, no single subset includes the complete challenge phrase. For example, access control layer could divide the challenge phrase "6fKa4" into 4 different subsets, illustrated in FIG. 3 as first character subset 301, second character subset 302, third character subset 303, and fourth character subset 304.

In some embodiments, access control layer 124 divides the challenge phrase by randomly eliminating a predetermined percentage of the characters in the challenge phrase, for example, approximately 35% of the characters. In further embodiments, access control layer 124 divides the challenge phrase so that a predetermined minimum number of the subsets are required to solve the challenge phrase. For example, the predetermined number may be three, in which case access control layer 124 may choose the character subsets such that no two of the subsets include all of the characters in the challenge phrase.

At step S204, access control layer 124 sends the subsets of the challenge phrase to client system 110, in response to the request to access protected content 122. For example, access control layer 124 may provide a challenge web page 400, as shown in FIGS. 4A-4D. Challenge web page 400 may include an animated section 410 comprising a plurality of images or frames (e.g., GIFs) corresponding to the subsets from access control layer 124. Challenge web page 400 may alternatively include images (e.g., JPEG files) corresponding to the subsets that are rotated in rapid succession to create an animated effect. In some embodiments, access control layer 124 receives the images or frames from image generator 126. As discussed in more detail below, image generator 126 may process the challenge phrase to generate a series of images or an animation used to present the challenge phrase to the user at client system 110. Each displayed frame may include one of the subsets of the characters in the challenge phrase. Each frame may randomly have a number (e.g., 2 or 3) of the characters missing. All necessary characters will be presented on at least one of the frames 401-404.

Figure 4A:
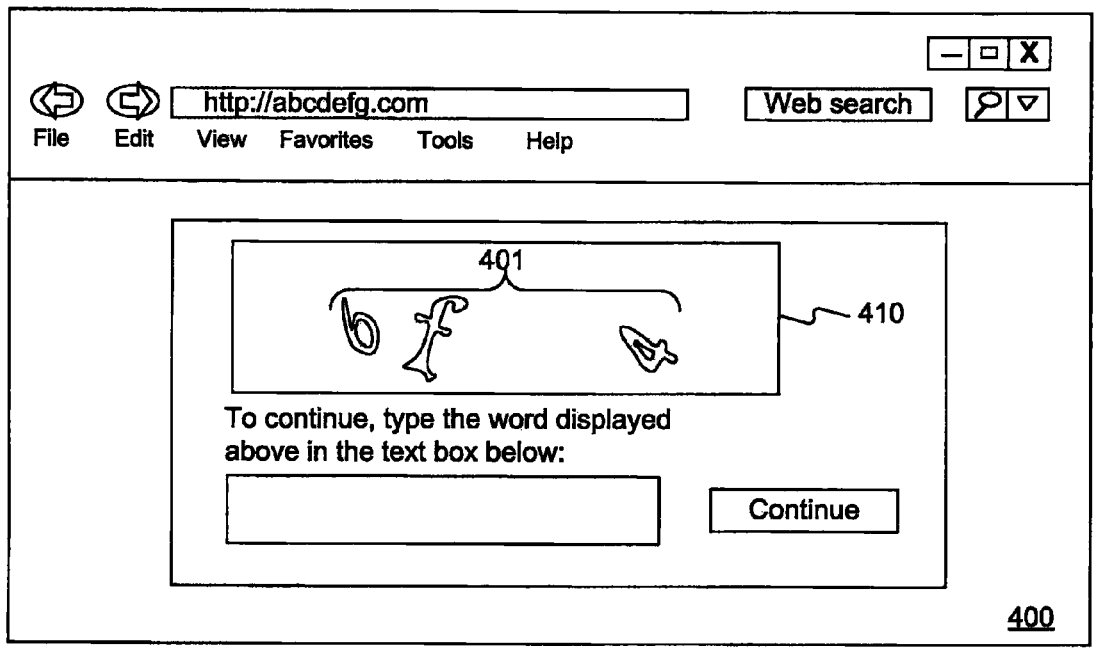
FIGS. 4A-4D illustrate exemplary user interfaces, consistent with certain embodiments of the invention.
Figure 4B:
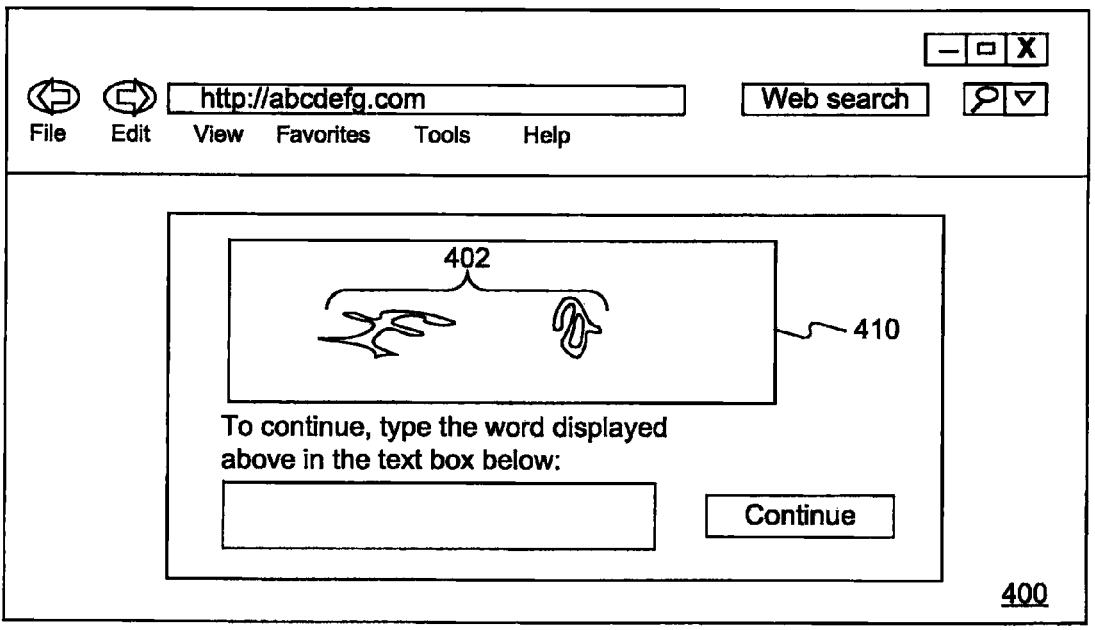
Figure 4C:
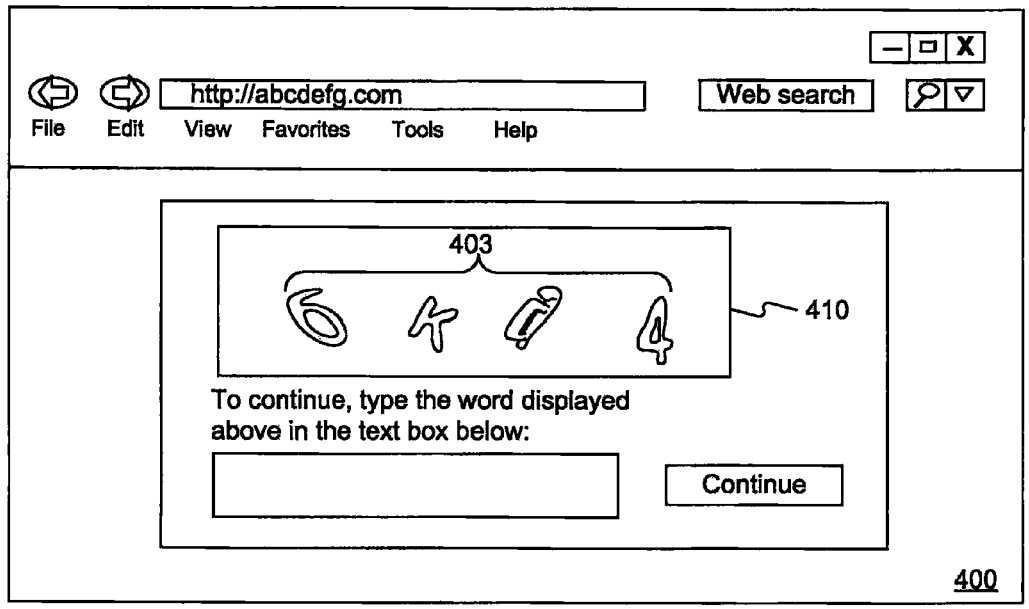
Figure 4D:
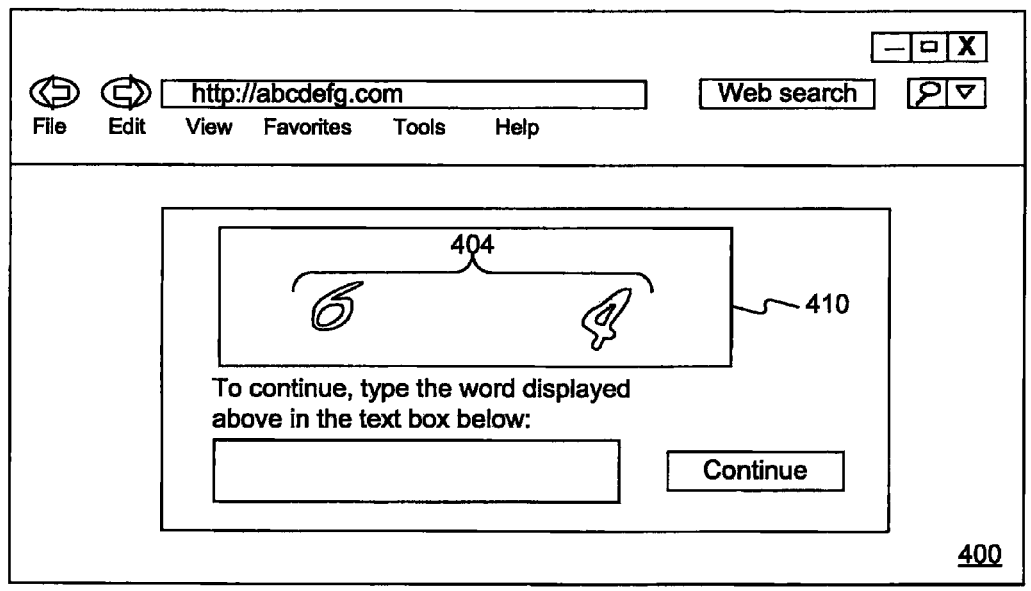

For example, as shown in FIG. 4A, animated section 410 may include a first image or frame 401 including the characters in subset 301. Similarly, as shown in FIG. 4B, a second image or frame 402 of animated section 410 may include the characters in subset 302. FIGS. 4C and 4D illustrate frames 403 and 404 with the characters in subsets 303 and 304, respectively.

In accordance with certain embodiments, no single frame of animated section 410 includes every character in the complete challenge phrase. Further, animated section 410 may be configured to rotate the animated frames 401-404 in succession, resulting in all characters being displayed at least once in the sequence of images. The transition between the image frames may be set a frequency suitable for human observation and recognition of the characters. Optionally, it is also possible to include at least one frame in the sequence where none of the characters are displayed (not shown in FIGS. 4A-4D).

At step S205, access control layer 124 receives a response to the challenge phrase. If the response is correct (i.e., the response matches the challenge phrase), method 200 moves to step S206, and the user is allowed to access the protected content. Otherwise, the method moves back to step S202, and a new challenge phrase is provided to the user. In some embodiments, access control layer 124 may lock access to the content after a certain number of failed challenge responses.

Consistent with the disclosed embodiments and features, while a web bot or computer may be able to perform an accurate optical character recognition on any of the displayed frames, it still will not have the complete set of characters comprising the challenge phrase. Further, even if "screen scraping" techniques are used and provided to a human user, even the human user will not have all of the characters necessary to complete the challenge phrase. However, the human user viewing the animation of the subsets of the challenge phrase via web page 400 can readily identify the correct challenge phrase and provide a proper response in order to access protected content 122.

While the exemplary method 200 can be implemented as a stand-alone technique, it may be desirable to use additional techniques to further enhance access control. For example, the characters displayed in animated section 410 can be stretched, warped, and/or rotated within a single image to make machine recognition of the individual characters more difficult. In some embodiments, the characters in each frame of animated section 410 are stretched, warped, and/or rotated differently, so that each character appears somewhat different in the various frames. In other embodiments, the background is manipulated as well. Such processing may be implemented by image generator 126, which may provide the generated images to access control layer 124 for implementing challenge/response processes such as those discussed above with respect to method 200.

Even when using the above techniques, a web bot or computer may attempt to overlay each frame to obtain a single, composite image. The web bot could then OCR the composite image thus obtained and attempt to defeat the access control method. In accordance with embodiments of the invention, additional techniques may be employed to counter any overlay attempts. Such techniques may include, for example, moving or repositioning the characters within the different frames. For example, the "6" in frame 401 could be moved up and to the left by a small distance, perhaps a millimeter, when displayed in frame 402. Likewise, the other characters may also be moved small distances up, down, right, or left. Using this technique, any composite images derived from all of the frames will be difficult to OCR, because the moving characters will cause any composite image derived from the moving characters to appear distorted or fuzzy, due to the movement of the characters within the frames.

Figure 5:
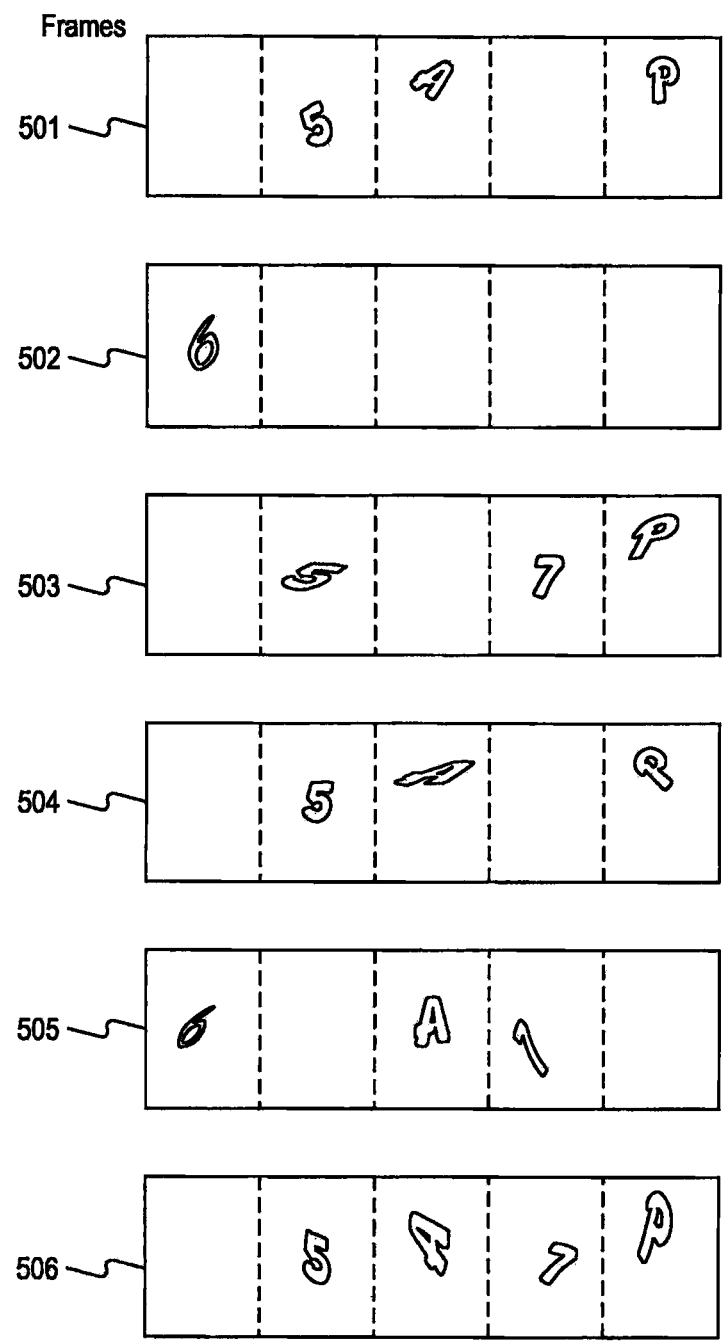
FIG. 5 illustrates another exemplary set of images for a challenge phrase, consistent with certain embodiments of the invention.

FIG. 5 is another example of a set of frames for a challenge phrase, in this case "65A7P." The challenge phrase of FIG. 5 may be generated by image generator 126. In the exemplary embodiment of FIG. 5, the challenge phrase is split over 6 frames, as referenced by 501-506 in the drawing. As discussed above, to overcome OCR and overlay attempts by web bots, characters can be moved within successive frames by either directly altering the displayed position of the character, as shown in FIG. 5. Additionally, or alternatively, overlay attempts may be countered by changing the width of predefined vertical segments from frame to frame (not shown).

Figure 6:
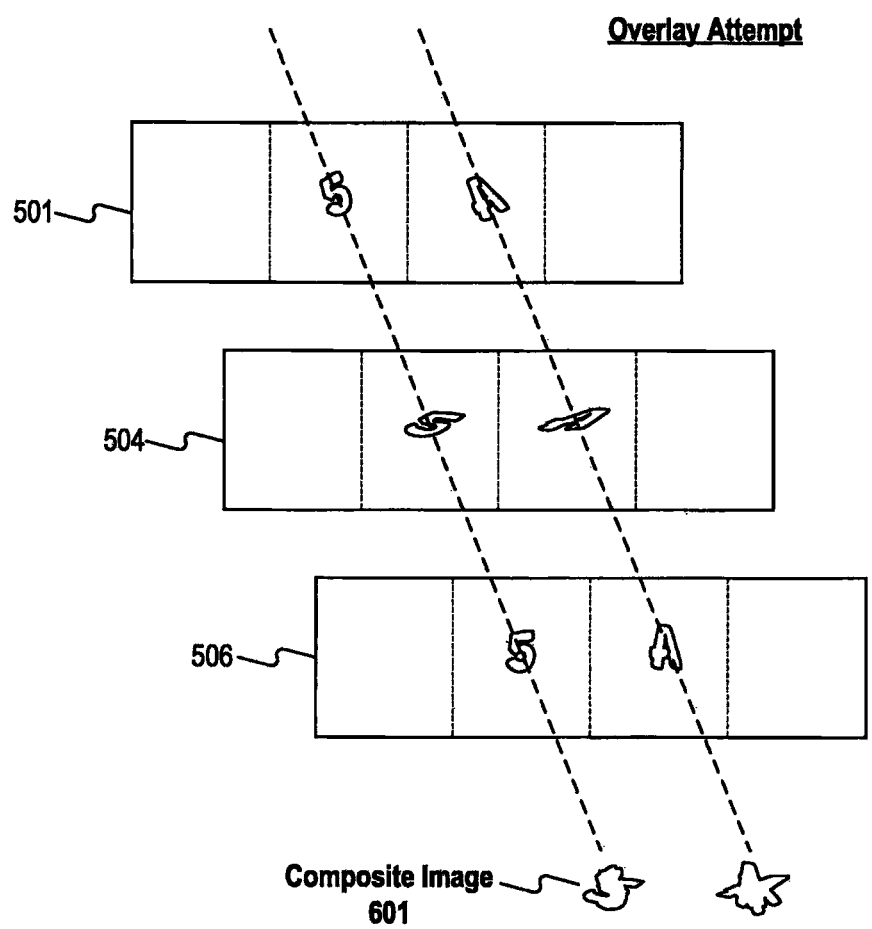
FIG. 6 includes exemplary images that illustrate an overlay attempt for a challenge phrase, consistent with certain embodiments of the invention.

To provide a better appreciation of the benefits of the embodiment of FIG. 5, FIG. 6 illustrates the results of an overlay attempt for the challenge phrase "65A7P." Assume a web bot captures or "scrapes" frames 501, 504, and 506 of FIG. 5. FIG. 6 illustrates how the characters "5" and "A" of the challenge phrase will appear in a composite image 601, created when overlaying frames 501, 504, and 506. Because the characters "5" and "A" are shifted in position from frame to frame, the character images from each frame do not line-up with one another. As a result, the overlapping characters "5" and "A" appear fuzzy or distorted in composite image 601, and are more difficult, if not impossible, for the web bot to accurately detect through conventional OCR methods.

In some embodiments, horizontal or vertical segments are defined within the individual frames and the characters are only moved within these horizontal or vertical segments. However, some web bots or computers of hackers may be programmed to divide images into vertical or horizontal segments and to attempt to identify a character for each segment. These web bots or computers may then overlay the same horizontal or vertical segment from multiple images to create a composite image for each segment. In order to prevent these techniques from successfully identifying the challenge phrase, the size of the segments is changed between the different frames. Thus, a composite image taken from the frames will be more difficult to correctly OCR than a similar image with consistent segment sizes from frame to frame. Further, the letters can be randomly moved within the defined segments, thus making each individual frame unique.

Further, in some embodiments, a selected one of the frames will contain a character that is not contained in any other frame. Thus, any web bot or computer that does not scrape the selected frame will be unable to provide a human user with the complete set of characters. This is true even if the web bot or computer scrapes the web site several times. Until the selected frame is scraped, there is no way to determine what the character is.

Figure 7:
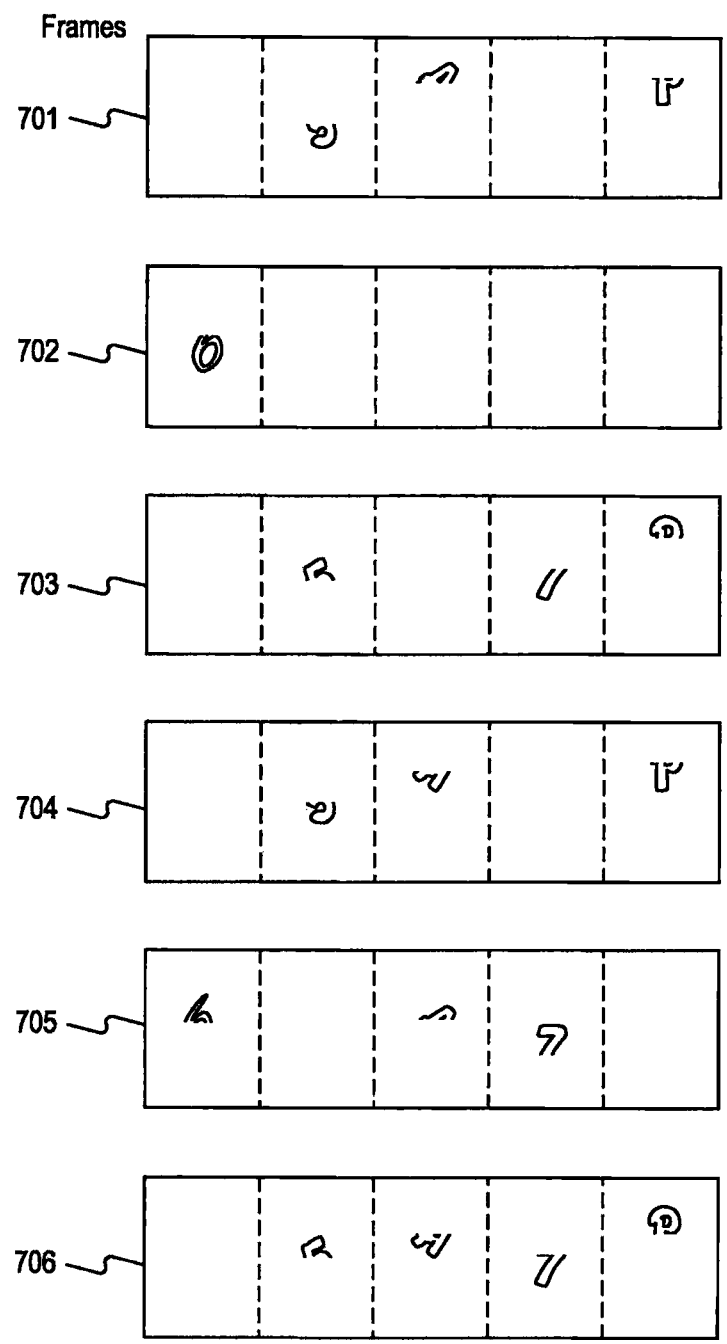
FIG. 7 illustrates exemplary images of a challenge phrase where individual characters are partially obscured in different frames, consistent with certain embodiments of the invention.

In still further embodiments, individual characters may be partially obscured in different frames. For example, as shown in FIG. 7, frames 501-506 may be modified by image generator 126 to include partially obscured characters, as illustrated with reference to 701-706. For example, frame 701 of FIG. 7 generally corresponds to frame 501 of FIG. 5. However, the "5," "A," and "P" characters shown in FIG. 7 have been obscured to hide the top or bottom of each character. Note, however, that the obscured portions of the characters generally appear in a separate frame. For example, the upper portion of the "5" obscured in frame 701 appears in frames 704 and 706. Likewise, the lower portion of the "A" obscured in frame 701 appears in frames 704 and 706, and the upper portion of the "P" obscured in frame 701 appears in frames 703 and 706. In some embodiments, some frames may include partially obscured characters, whereas other frames may include unobscured characters. By obscuring portions of characters in this manner, a web bot or computer attempting to OCR frames 701-706 will not have complete characters to OCR. However, a human user observing the animated frames being rotated in succession will be able to discern the correct letters in each frame.

Figure 8:
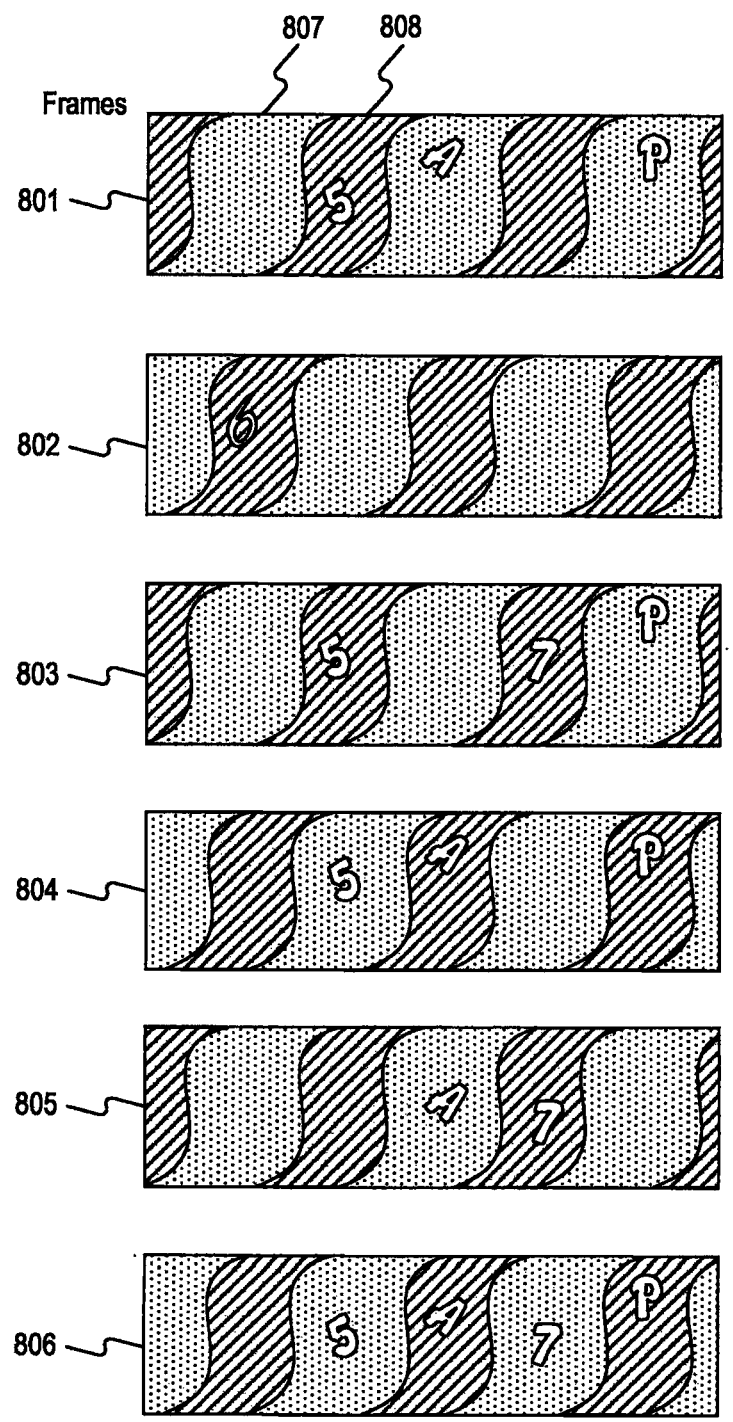
FIG. 8 illustrates exemplary images of a challenge phrase where individual characters are superimposed on moveable background patterns, consistent with certain embodiments of the invention.

In still further embodiments, the characters in each frame may be superimposed on a moveable background pattern by image generator 126. The moveable background may include a dotted pattern 807, and/or an "S-shaped" striped pattern 808. As can be seen from FIG. 8, in each successive frame, S-shaped striped pattern 808 moves to the right on top of dotted pattern 807. This technique may increase the level of difficulty for a web bot or computer attempting to OCR the individual characters in frames 801-806, because the background patterns 807 and 808 may obscure the outline of the letters in each frame. However, because human users are generally capable of recognizing patterns such as 807 and 808, a human user will correctly be able to discern the outline of each letter, even with the letters superimposed on the moveable background. In some embodiments, random colors may be used for patterns 807 and 808, as well as for the superimposed characters. In still further embodiments, patterns 807 and 808 may be randomly selected from a larger number of patterns, such as cross-hatched patterns, checked patterns, or vertically and horizontally striped patterns (not shown).

Figure 9:
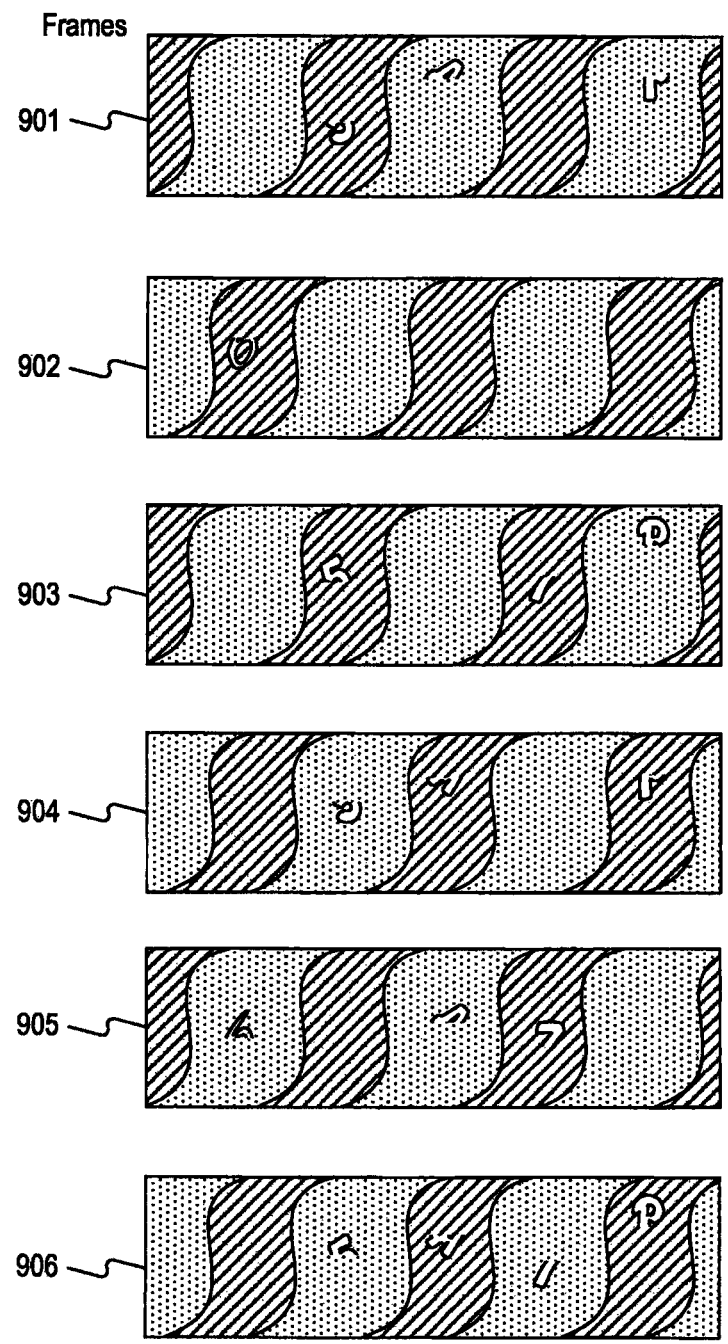
FIG. 9 illustrates exemplary images of a challenge phrase where all or part of the characters are obscured as they are superimposed on a background, consistent with certain embodiments of the invention.

FIG. 9 illustrates a combination of the techniques discussed above with respect to FIGS. 7 and 8, i.e., the partially obscured characters shown in FIG. 7 imposed on the moveable backgrounds shown in FIG. 8. By superimposing the partial characters of FIG. 7 on background patterns 807 and 808, it is even more difficult to OCR the partial characters, because background patterns 807 and 808 may obscure the outlines of the partial characters. However, a human user viewing frames 901-906 in rapid succession, such as during an animation, will be able to recognize that pattern 808 is moving relative to pattern 807. Thus, the human user will recognize the partial character outlines more easily than a web bot or computer of a hacker, and be able to discern the correct characters to solve the challenge phrase "65A7P."

When using moveable background patterns such as those discussed above with respect to FIGS. 8 and 9, the colors used for the background patterns should provide sufficient contrast so that a human user can discern the outlines of the characters and/or partial characters. For example, if dotted pattern 807 consists of small black dots on a white background, and the superimposed letters are also white or a light color such as light yellow or pink, there may be insufficient contrast between the letters and dotted pattern 807 to enable a human user to correctly identify the characters. Likewise, if striped S-shaped pattern 808 consists of black stripes on a dark brown S-shape, and the superimposed letters are also black, brown, or other dark colors such as dark blue or grey, there may be insufficient contrast between the letters and striped S-shape pattern 808 for a human user to correctly identify the characters. Thus, in some embodiments, image generator 126 may select the colors used for the characters and backgrounds based on predefined rules that identify acceptable color combinations.

Figure 10:
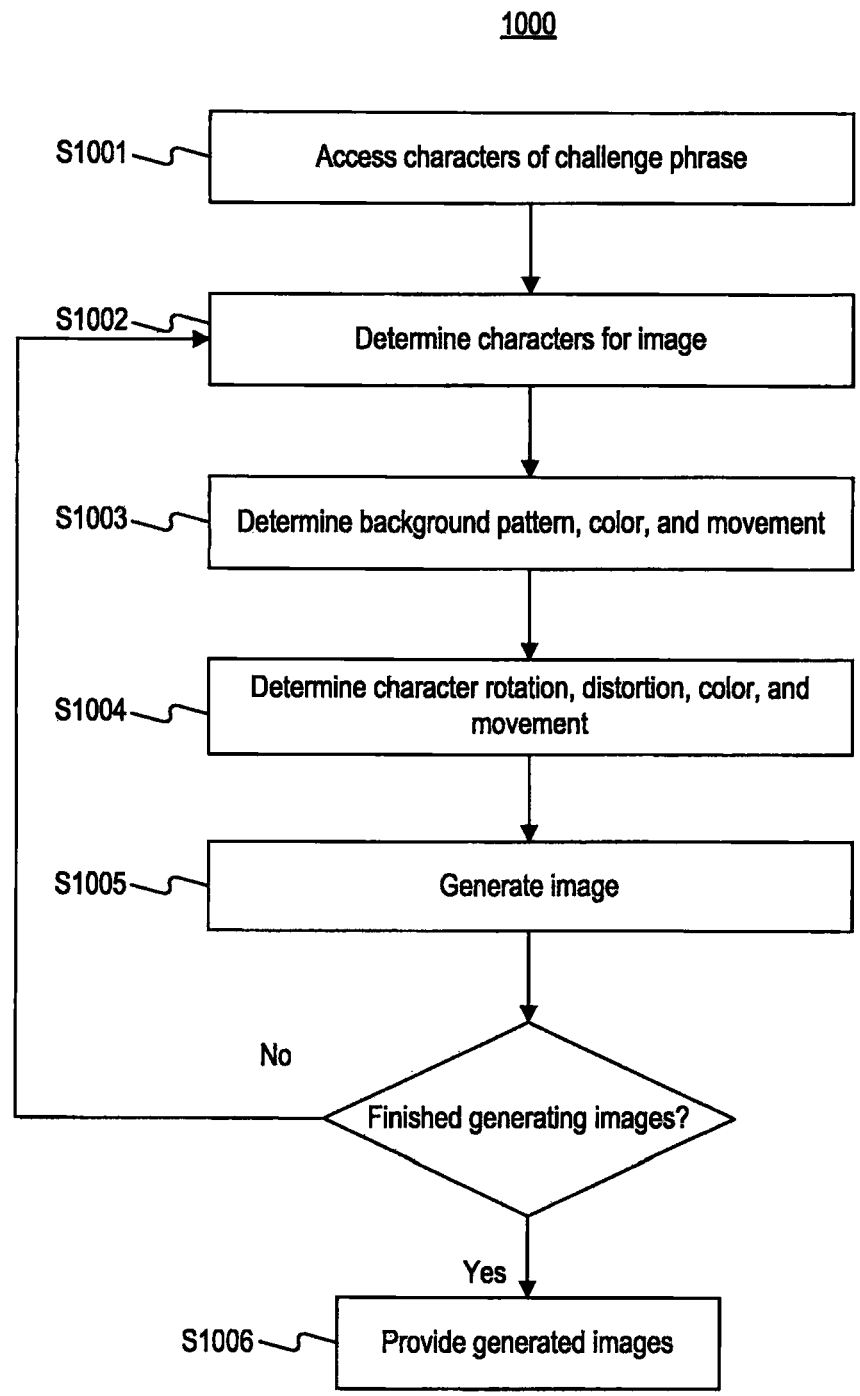
FIG. 10 is a flowchart of an exemplary method for generating challenge-response images to limit access to content, consistent with certain embodiments of the invention.

FIG. 10 illustrates a flowchart of an exemplary method 1000 for generating challenge-response images which may be used to limit access to protected content. Method 1000 may be implemented by, for example, image generator 126 (FIG. 1).

Method 1000 beings at step S1001, where image generator 126 accesses characters of a challenge phrase, such as "65A7P" shown in FIGS. 5-9. For example, image generator 126 may receive the challenge phrase from access control layer 124. The challenge phrase received from access control layer 124 may be represented as text characters, such as ASCII or Unicode identifiers, or using other suitable computer techniques for representing characters.

Generally speaking, after step S1001, method 1000 will iterate through steps S1002 to S1005 to generate a plurality of images (e.g., frames 901-906), which will then be provided as a challenge-response test to access control layer 124 at step S1006. For example, as shown in FIG. 9, the first time through steps S1002-S1005, image generator 126 may generate frame 901, the second time through steps S1002-S1005, access control layer 124 may generate frame 902, etc., until all frames 901-906 have been generated.

After image generator 126 accesses the characters of the challenge phrase, method 1000 moves to step S1002. At step S1002, image generator 126 may determine which characters to use for a first challenge-response image. For the purposes of this example, image generator 126 determines to use the character subset "5," "A," and "P," e.g. as shown in frame 901. In some embodiments, access control layer 124, instead of image generator 126, may determine which characters are used for each subset.

Next, at step S1003, image generator 126 may determine one or more background patterns for the characters used in the first image. Image generator 126 may also determine one or more colors for the background pattern, and whether any movement should be applied to the background pattern. For example, image generator 126 may randomly select dotted pattern 807 from a plurality of patterns, as well as striped S-shape pattern 808 to be superimposed on dotted pattern 807. Image generator 126 may also select colors for the patterns, e.g., black dots on a white background for dotted pattern 807, and black stripes on a white background for striped S-shape pattern 808. In some embodiments, the characteristics of the background used for the images are provided by adaptive challenge engine 128, based on one or more characteristics of client system 110.

Next, at step S1004, image generator 126 may determine any distortion, rotation, obscuration, and/or movement to apply to the characters for the first image, as well as a color for the characters. For example, image generator 126 may determine that one or more of the characters for frame 901 should be stretched, rotated, or warped to make the character more difficult to OCR. In some embodiments, image processing libraries, such as the open-source ImageMagick software suite, may be used to perform shearing, arc, wave, or swirl distortion on the characters. Such image processing may also be applied to background patterns, before, after, or concurrently with the image processing being applied to the character images.

Image generator 126 may also generate the character images using various fonts, such as by randomly selecting a common font for each challenge phrase, a different font for each frame, or different fonts for each character within a frame. In some embodiments, the characteristics of the background used for the images are provided by adaptive challenge engine 128, based on characteristics of client system 110.

At this step, image generator 126 may also obscure all or part of the characters as they are superimposed on the background. For example, as shown in FIG. 9, the top half of the "5" and "P" and the bottom half of the "A" are obscured in frame 902. Image generator 126 may also move the characters around within the predefined segments, e.g., if the character is "centered" by default, note that the "A" and the "P" are both moved up relative to the center of frame 901, whereas the "5" is moved down somewhat. Also note that the "P" is moved somewhat to the right of center in the rightmost vertical segment of frame 901 (this is most readily apparent in corresponding frame 701 of FIG. 7, which illustrates the vertical segments as dotted lines).

Furthermore, image generator 126 may also select one or more colors for the characters. As discussed above, background patterns 807 and 808 use black dots/stripes on a white background. Thus, image generator 126 may select a medium gray color for the letters, since this color will contrast reasonably well with both the black and the white colors of background patterns 807 and 808.

In some embodiments, image generator 126 may randomly select both the background and the character colors. In such embodiments, image generator 126 may store a table (not shown) with acceptable color combinations for backgrounds and letters (e.g., colors with sufficient contrast), and randomly select the colors for the characters from the colors in the table that are acceptable for the background color(s) selected at step S1003. In other embodiments, the character colors may be selected first, and the background colors selected based on a table such as that discussed above. In still further embodiments, the colors of the characters within each frame may be varied, e.g., medium gray for the "5" in frame 901, medium blue for the "A," and medium red for the "P."

Next, at step S1005, image generator 126 generates an image, e.g., frame 901, based on the background and character parameters selected above in steps S1002-S1004. The frame may consist of an image file such as a JPEG file, or may be the first frame of a multi-frame file with each frame including an image, such as a GIF file. At this time, image generator 126 stores the generated image, frame 901, and moves back to step S1002 to continue generating images. As shown in FIG. 10, image generator 126 continues with steps S1002-S1004 until all of the images (e.g., frames 901-906) are generated.

For example, image generator 126 may perform steps S1002-S1004 to generate frame 902. At step S1002, image generator 126 selects the character "6" as the only character for the frame. Next, at step S1003, image generator 126 determines a background pattern, color, and movement for frame 902. For example, as shown in FIG. 9, image generator 126 may move the striped S-shape to the right relative to frame 901. Note that FIG. 9 illustrates a common background pattern and color in each frame. However, in some embodiments, the background patterns and colors may also be varied between frames at this step. Next, at step S1004, image generator 126 processes the "6" character, for example by obscuring the top of the "6" as shown in frame 902.

Once image generator 126 has finished generating all of frames 901-906, method 1000 moves to step S1006, where image generator 126 provides the generated images to access control layer 124, which in turn provides the generated images to a user who is being requested to respond to the challenge phrase. For example, access control layer 124 may transmit a series of image files created by image generator 126 (e.g., JPEG files), or a single animation file (e.g., GIF file) to client system 110. In some embodiments, multiple JPEG image files may be rotated in succession using script code, such as Java Script (an "animated JPEG").

As the image files or frames of the .gif are rotated in succession as a single animation on client system 110, the user should be able to correctly determine the challenge phrase and provide a response corresponding to the challenge phrase in order to access any protected content. Using the disclosed techniques, different image processing techniques can be performed from frame-to-frame on a character that is common to multiple frames. For example, from frame-to-frame, different amounts of distortion can be applied to the common character, different parts of the common character can be obscured, different fonts can be used, or variations of any of the other disclosed techniques may be applied to the common character.

In still further embodiments, the challenge phrase and images generated for a given client system may be adaptively adjusted depending on certain characteristics of the client. For example, if a user is a suspected hacker, it may be beneficial to make the challenge phrase more difficult than in the case where the client is not suspected to be a hacker. This implementation makes it more difficult for suspected hackers to solve the challenge phrase, particularly where the suspected hacker uses a web bot or other automated technique to recognize the challenge phrase.

As discussed in more detail below, it may be beneficial to increase the size, e.g., number of bytes of data, of the frames/animation used to provide the challenge phrase when the client is a suspected hacker. This technique may not necessarily make it more difficult for a hacker's web bot to solve the challenge phrase. However, the longer download times associated with the larger data files used to display the challenge phrase may slow down the rate at which a suspected hacker attempts to solve challenge phrases and access protected content 122.

In still further embodiments, the frames and/or animation may be generated before receiving a request from client system 110. For example, each night, server system 120 may generate and store a series of pre-generated challenge phrases and corresponding images/frames. Upon receiving a request from client system 110 to access protected content 122, the stored images/frames may be retrieved by access control layer 124 and presented to the user by, for example, using method 200.

Figure 11A:
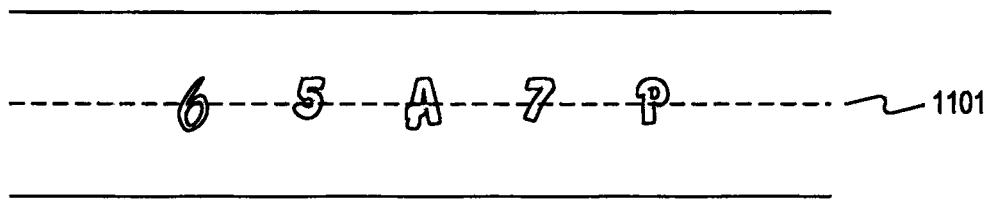
FIGS. 11A-11C illustrate exemplary images with image-distortion techniques applied to characters of a challenge phrase, consistent with certain embodiments of the invention.
Figure 11B:
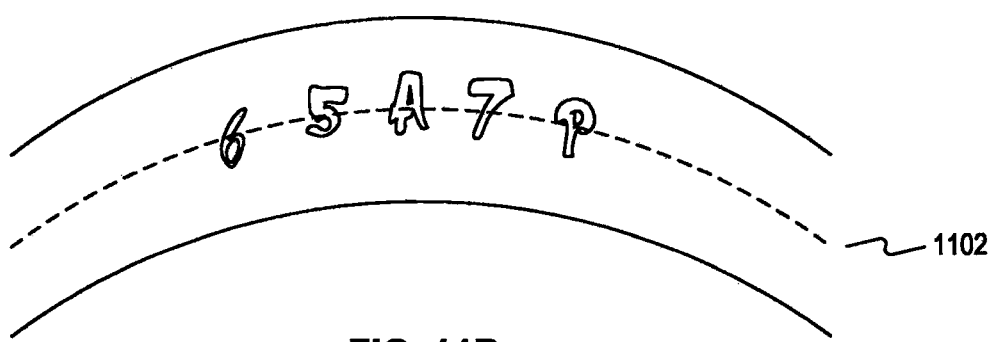
Figure 11C:
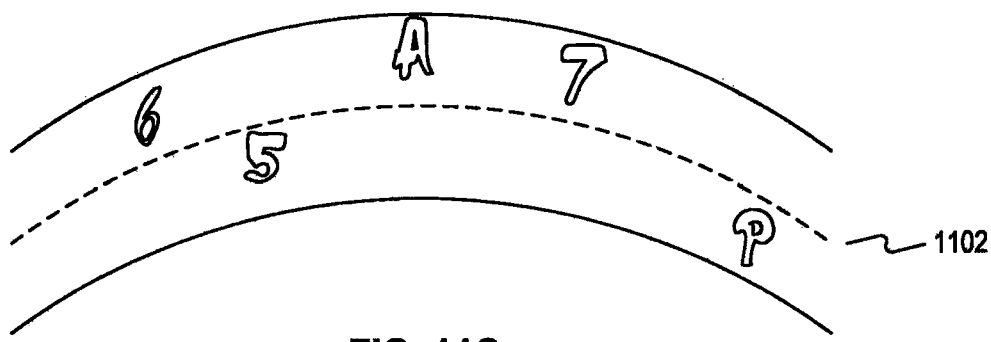

As disclosed herein, image generator 126 may apply various image-distortion techniques to the characters of the challenge phrase. FIGS. 11A-11C illustrate an example of arc distortion technique suitable for application to these characters. FIG. 11A illustrates the challenge phrase before arc distortion is applied to the characters. As can be seen from FIG. 11A, the characters are aligned horizontally along straight dotted line 1101.

FIG. 11B illustrates the application of arc distortion to the characters by image generator 126. As shown in FIG. 11B, the entire challenge phrase is "bent" around the radius of a circle, illustrated partially by curved dotted line 1102. This has several effects on the character images. First, characters "6" and "5" are shifted down and to the right somewhat, relative to their position in FIG. 11A, and character "6" is shifted somewhat more due to it's greater distance from the center of the challenge phrase, e.g., the position of character "A." Likewise, characters "7" and "P" are also shifted downward, but to the left, e.g., closer to the center of the circle illustrated by curved dotted line 1102.

A second, more subtle effect also takes place upon application of the arc distortion. As seen in FIG. 11B, the top of the characters tends to broaden somewhat due to the arc distortion, because the top of the characters are further away from the center of the circle. In contrast, the bottom of the characters tends to narrow somewhat, because the bottom of the characters are closer to the center of the circle. Note, for example, that the top portion of each of the characters in FIG. 11B are somewhat "fatter" than the top portions of these characters in FIG. 11A, and likewise the bottom portions of these characters are somewhat "slimmer" in FIG. 11B than in FIG. 11A.

As discussed above with respect to the exemplary method 1000, the characters of the challenge phrase may be offset horizontally and vertically relative to their original positions. In some embodiments, the horizontal and vertical offsetting is applied by image generator 126 after the arc distortion is applied. Thus, as shown in FIG. 11C, the characters retain the broadening/narrowing characteristics discussed above, but are offset from their vertical positions relative to curved line 1102, as well as offset horizontally relative to their positions in FIG. 11B.

Figure 12:
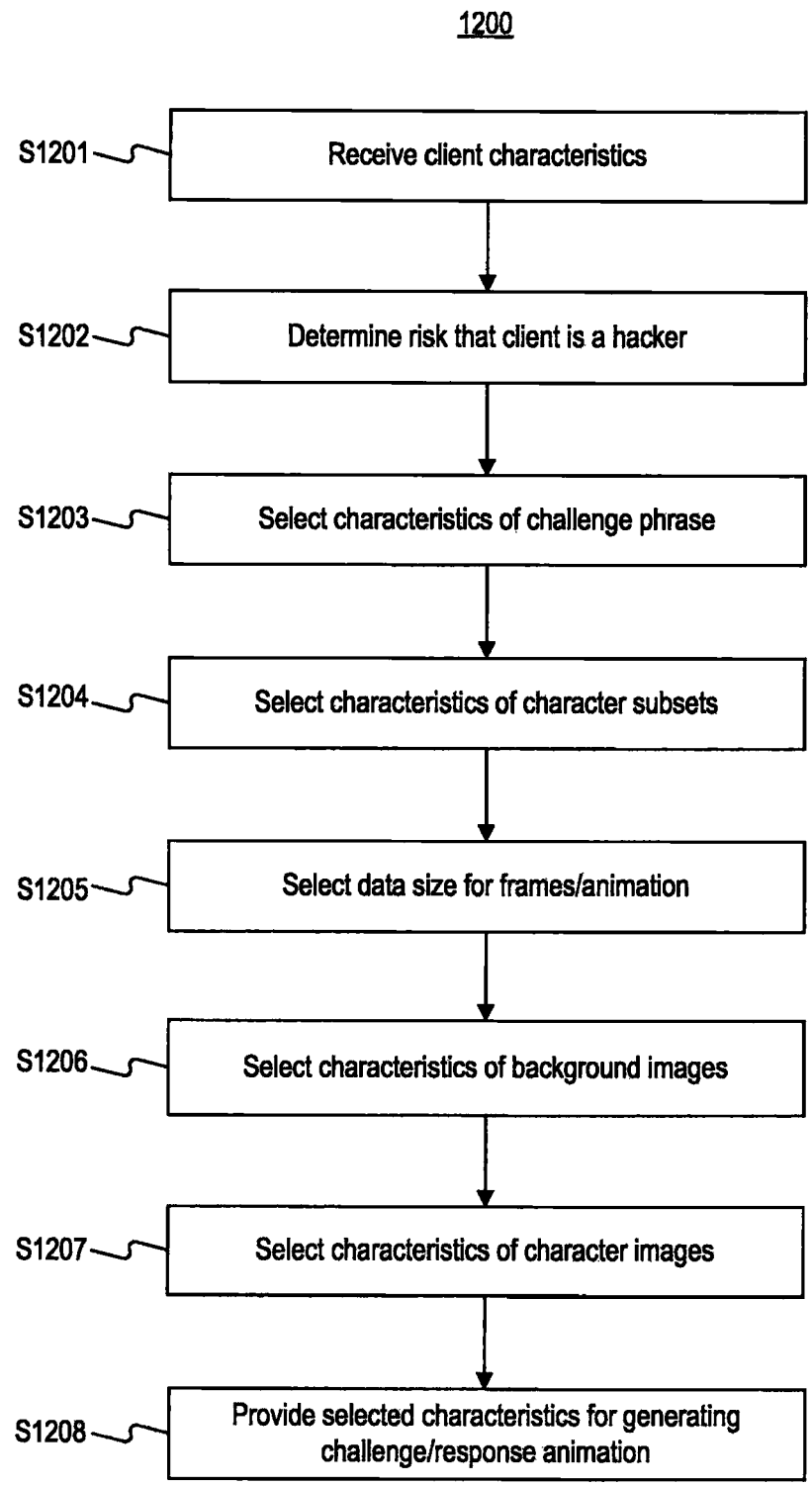
FIG. 12 is a flowchart of an exemplary method for adaptively selecting characteristics of a challenge/response test, consistent with certain embodiments of the invention.

FIG. 12 illustrates a flowchart of an exemplary method 1200 for adaptively selecting characteristics of a challenge/response test based on characteristics of a client requesting access to protected content. Generally speaking, method 1200 may be used to select the length of a challenge phrase, the subsets of characters that are used to divide the challenge phrase, the data size of frames and/or animation files that are used to deliver the challenge phrase to a client, and characteristics of the background and character images. Some of the selected characteristics can be used as inputs to image generator 126 method 1000, and used by image generator 126 to determine the characteristics of the images for the challenge phrase. Likewise, some of the selected characteristics can be used as inputs to access control layer 124 for method 200, for example, the number of characters to use in the challenge phrase.

Method 1200 begins with step S1201, where adaptive challenge engine 128 receives one or more characteristics of client system 110, which is requesting access to protected content 122. Generally speaking, the characteristics may be any information identifying client system 110 or information about processing implemented by client system 110. For example, the characteristics may include an IP or MAC address received from client system 110. In other embodiments, the characteristics may be data indicating whether client system 110 is implementing a session management technique, such as using a username and password to access protected content 122, using a secure communication channel such as secure sockets layer ("SSL") or transport layer security ("TLS"), or whether client system 110 allows server 120 to store session management data such as cookies on client system 110.

Next, method 1200 moves to step S1202, where adaptive challenge engine 128 determines a risk profile for client system 110, based on the one or more characteristics received at step S1201. In some embodiments, the risk profile may reflect one or more risk levels that correspond to a likelihood that client system 110 is a hacker that should not be allowed to access protected content 122. For example, when the client characteristics include an IP address, adaptive challenge engine 128 may perform an IP geo-location to determine whether client system 110 is located in a country, state, or other geographical region known for originating hacker activity. Alternatively, if the client characteristics include a MAC address, adaptive challenge engine 128 may determine whether the MAC address is known to correspond to a computer previously used for actual or attempted hacking of web sites.

In embodiments where the characteristics indicate whether client system 110 is implementing session management techniques, the use of session management techniques may also be used to determine the risk profile. Generally speaking, hackers prefer not to use session management techniques, e.g., they prefer not to provide user names/passwords, use SSH/TLS, or allow cookies to be stored on their computers. Thus, client system 110 may be assigned a relatively higher risk level when client system 110 refuses to allow cookies, use SSH/TLS, or provide a username/password combination.

In some embodiments, the risk profile determined at step S1202 may simply be a binary selection, i.e., suspected hacker or not, based on whether any of the above-discussed indications are present in the client characteristics. In further embodiments, the profile may reflect one of several risk levels that are defined as a function of the client characteristics. For example, a low risk level may be assigned when the IP address is not from an area known for high levels of hacking activity and the client implements at least one session management technique. A medium risk level may be assigned when the client is either from an area with high levels of hacking activity or does not implement session management, but not both. Finally, a high risk level may be assigned when the client is both from an area known for high levels of hacking activity and does not implement any session management techniques. Those skilled in the art will understand that further variations of these techniques are possible, and any combination of client characteristics may be used to assign more refined levels of risk to clients.

Next, method 1100 moves to step S1203, and adaptive challenge engine 128 selects one or more characteristics for the challenge phrase based on the risk profile determined at step S1202. Generally speaking, for lower risk levels, adaptive challenge engine 128 may select shorter or otherwise easier to solve challenge phrases. For example, for a low risk level, adaptive challenge engine 128 may select a six-letter word, such as "patents." For a high risk level, adaptive challenge engine 128 may select an eight-letter word, such as "channels." In still further embodiments, adaptive challenge engine 128 may use combinations of alphanumerical characters that do not form a word to increase the difficulty of the challenge phrase, such as "x84BcEE9," and use such non-word challenge phrases for higher risk levels. In some embodiments, adaptive challenge engine 128 also sets a timeout period for solving the challenge phrase at this time. In some embodiments, shorter timeout periods are used for clients with higher risk levels, thus giving suspected hackers less time to solve the challenge phrase.

Next, method 1200 moves to step S1204, where adaptive challenge engine 128 selects characteristics of the character subsets used to present the challenge phrase to the user, based on the risk profile. For example, for lower risk levels, adaptive challenge engine 128 may use a higher percentage of the characters in each subset. Thus, adaptive challenge engine 128 may remove only 33%, or ⅓, of the characters for a lower-risk client by dividing the challenge phrase "patents" into character subsets missing only two letters each, e.g., "p_t_nts," "_tent_," "p_te_ts," etc. For higher risk levels, adaptive challenge engine 128 may use a lower percentage of the characters of the challenge phrase for each subset. Thus, adaptive challenge engine 128 may remove 50% of the characters for a higher-risk client by dividing the challenge phrase "x84BcEE9" into subsets missing four letters each, e.g., "x_B_E__9," "x84B_," "x__4_c_E_," etc.

Next, method 1200 moves to step S1205, where adaptive challenge engine 128 selects a data size for the frames and/or animation used to present the challenge phrase to the user, based on the risk profile. For example, if the client has a lower risk level, a relatively smaller .gif (e.g., 10-15 kb) or relatively smaller JPEGs (e.g., 1-5 kb) may be used for the frames/animation.

In contrast, when the client has a higher risk level, larger files, e.g. 100-120 kb for a GIFs or 50-80 kb for JPEGs, may be used to slow the rate at which the client can download the challenge phrase and therefore make it more difficult for a hacker to use automated techniques to access protected content 122.

Next, method 1200 moves to step S1206, where adaptive challenge engine 128 selects characteristics of the background images for the individual frames of the challenge phrase, based on the risk profile. For example, adaptive challenge engine 128 may select a solid background for a low-risk client, a patterned background for a medium-risk client (such as pattern 807 or 808, FIG. 8), and a multi-pattern background for a high-risk client (e.g., pattern 808 superimposed on pattern 807). In further embodiments, adaptive challenge engine 128 may also select movement for the background at this step. For example, still backgrounds may be used for low-risk clients, whereas moving backgrounds may be used between frames (e.g., frames 801-806) for higher-risk clients. In still further embodiments, movement rates may be varied based on the risk level of the client, for example by moving one or more background patterns more quickly for higher-risk clients.

Next, method 1100 moves to step S1207, where adaptive challenge engine 128 selects characteristics of the images used to represent the characters of the challenge phrase, based on the risk profile. For example, for a low-risk client, adaptive challenge engine 128 may select that the characters should not be stretched, rotated, warped, obscured, or otherwise distorted as discussed above. For a medium-risk client, adaptive challenge engine 128 may select only one such technique, for example obscuring parts of the individual character images without distorting them. For a high-risk client, adaptive challenge engine 128 may select multiple such techniques, for example selecting that the character images should be both rotated from frame-to-frame while obscuring parts of the characters, e.g., the top or bottom half of the characters. In still further embodiments, access control layer may select higher levels of distortion or obscuration as risk levels increase. For example, as client risk levels increase, the characters may be increasingly distorted or rotated, or more of the characters may be obscured. Likewise, vertical and/or horizontal movement of the characters within each frame may be increased for higher risk levels.

Adaptive challenge engine 128 may also select larger characters (e.g., font size 20) for clients with lower risk levels, and smaller characters (e.g., font size 12) for clients with higher risk levels. In addition, adaptive challenge engine 128 may vary the contrast between the background and the characters at this step. When the client has a relatively low risk level, colors with a high contrast (e.g., black and white) may be used for the background and characters, respectively. Conversely, when the client has a relatively high risk level, colors with lower contrast (e.g., blue and purple) may be used for the background characters, respectively, to make OCR and other automated techniques more difficult. In still further embodiments, a single font may be used for lower risk levels, and more fonts may be used to represent the characters for higher risk levels. Thus, even a hacker that is successful at OCR'ing one of the fonts may still be unable to OCR the other fonts used to represent the characters.

Next, method 1200 moves to step S1208, where the selected characteristics are provided for generating a challenge/response animation. In certain embodiments, the characteristics of the challenge phrase, such as the length of the challenge phrase and whether the challenge phrase should be a word or a string of random characters, may be provided as inputs to access control layer 124 for performing, for example, method 200. Likewise, the characteristics of the character images and background, such as data size of the frames/animation, background characteristics, and character image characteristics may be provided as inputs to image generator 126 for performing, for example, method 1000.

The foregoing description has been presented for purposes of illustration. It is not exhaustive and does not limit the invention as claimed to the precise forms or embodiments disclosed. Modifications and adaptations will be apparent to those skilled in the art from consideration of the specification and practice of the disclosed embodiments.

By way of example, the described implementations include software, but systems and methods consistent with the present disclosure may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing e-mail or browser software. Further, while the disclosed embodiments describe using multiple frames of a GIF file to display subsets of characters of the challenge phrase, other file image or video file types may be suitable. For example, one or more JPEG or other image files can be rotated in succession, rather than using an animated GIF. Multiple frames of a video file in a format such as MPEG, AVI, M-JPEG, or Flash are also suitable for implementing the disclosed techniques.

Moreover, while illustrative embodiments have been described herein, the scope of the invention as claimed includes any and all embodiments having equivalent elements, modifications, omissions, combinations (e.g., of aspects across various embodiments), adaptations and/or alterations as would be appreciated by those in the art based on the present disclosure. The steps of the disclosed methods may be modified in any manner, including by reordering steps and/or inserting or deleting steps, without departing from the principles of the invention, as set forth in the following claims.

What is claimed is:

1. A computer-implemented method comprising:
receiving one or more characteristics of a client requesting access to protected content, the protected content comprising data;
determining, with at least one processor, a risk profile for the client based on the client characteristics, the risk profile reflecting a likelihood that the client is unauthorized to access the protected content;
selecting, with at least one processor, first challenge characteristics or second challenge characteristics of a challenge/response test based on the risk profile;
generating a challenge/response test based on the selected challenge characteristics, the generating comprising:
determining a challenge phrase comprising a plurality of characters; and
dividing the challenge phrase into at least two character subsets selected from the plurality of characters comprising the challenge phrase; and
providing the at least two character subsets for consecutive display on the client at a predetermined frequency,
wherein the first challenge characteristics and the second challenge characteristics each reflect distortion levels used to distort characters of the challenge/response test, and the first challenge characteristics reflect less character distortion than the second challenge characteristics.

2. The computer-implemented method according to claim 1, wherein the client characteristics include one or more of an IP address, a MAC address, or session management technique implemented by the client.

3. The computer-implemented method according to claim 1, wherein the first challenge characteristics and the second challenge characteristics each reflect timeout periods during which the client must provide a response to the challenge/response test, and the first challenge characteristics reflect a shorter timeout period than the second challenge characteristics.

4. The computer-implemented method according to claim 1, wherein the first challenge characteristics and the second challenge characteristics each reflect data sizes associated with image frames of the challenge response test, and the first challenge characteristics reflect a larger data size than the second challenge characteristics.

5. The computer-implemented method according to claim 1, wherein the first challenge characteristics and the second challenge characteristics each reflect colors used for characters and background of the challenge/response test, and the first challenge characteristics reflect less contrast between the characters and background than the second challenge characteristics.

6. The computer-implemented method according to claim 1, wherein the first challenge characteristics reflect that one or more characters of the challenge/response test should be obscured, and the second challenge characteristics reflect that the one or more characters should not be obscured.

7. The computer-implemented method according to claim 2, wherein the session management technique includes at least one of a username and password provided by the client, a secure shell or transport-layer security communication protocol used by the client, or the client allowing cookies for session management to be stored at the client.

8. The computer-implemented method according to claim 1, wherein the first challenge characteristics and second challenge characteristics each reflect a number of characters to include in the challenge/response test, and wherein the first challenge characteristics reflect a greater number of characters than the second challenge characteristics.

9. The computer-implemented method according to claim 1, wherein the first challenge characteristics reflect that the plurality of characters does not include a word, while the second challenge characteristics reflect that the plurality of characters does include a word.

10. The computer-implemented method according to claim 1, wherein the first challenge characteristics and second challenge characteristics each reflect movement of a background in the challenge/response test, and the first challenge characteristics reflect moving a background more quickly than the second challenge characteristics.

11. The computer-implemented method according to claim 1, wherein the challenge/response test includes a challenge phrase comprising a plurality of characters, wherein the challenge phrase is divided into at least two character subsets selected from the plurality of characters comprising the challenge phrase, each of the at least two character subsets comprising less than all of the characters comprising the challenge phrase.

12. The computer-implemented method according to claim 11, wherein the first challenge characteristics and the second challenge characteristics each reflect a percentage of characters of the challenge phrase to include in each of the character subsets, and wherein the first challenge characteristics reflect a lower percentage of characters than the second challenge characteristics.

13. The computer-implemented method according to claim 1, wherein the first challenge characteristics and the second challenge characteristics each reflect a number of fonts to include in the challenge/response test, and wherein the first challenge characteristics reflect a greater number of fonts than the second challenge characteristics.

14. A system comprising:
a memory device that stores instructions; and
at least one processor that executes the instructions and is configured to:
receive one or more characteristics of a client requesting access to protected content, the protected content comprising data;
determine a risk profile for the client based on the client characteristics, the risk profile reflecting a likelihood that the client is unauthorized to access the protected content;
select first challenge characteristics or second challenge characteristics of a challenge/response test based on the risk profile;
generate a challenge/response test based on the selected challenge characteristics by:
determining a challenge phrase comprising a plurality of characters; and
dividing the challenge phrase into at least two character subsets selected from the plurality of characters comprising the challenge phrase; and
provide the at least two character subsets for consecutive display on the client at a predetermined frequency,
wherein the first challenge characteristics and the second challenge characteristics each reflect distortion levels used to distort characters of the challenge/response test, and the first challenge characteristics reflect less character distortion than the second challenge characteristics.

15. The system of claim 14, wherein the client characteristics include at least one of an IP address, a MAC address, or session management technique implemented by the client.

16. The system of claim 14, wherein the first challenge characteristics and the second challenge characteristics each reflect a number of characters to include in the challenge/response test, and wherein the first challenge characteristics reflect a greater number of characters than the second challenge characteristics.

17. The system of claim 14, wherein the first challenge characteristics and the second challenge characteristics each reflect timeout periods during which the client must provide a response to the challenge/response test, and the first challenge characteristics reflect a shorter timeout period than the second challenge characteristics.

18. The system of claim 14, wherein the first challenge characteristics and the second challenge characteristics each reflect colors used for characters and background of the challenge/response test, and the first challenge characteristics reflect less contrast between the characters and background than the second challenge characteristics.

* * * * *